(No Model.) 3 Sheets—Sheet 1.

G. A. ENSIGN.
POLISHING MACHINE.

No. 558,641. Patented Apr. 21, 1896.

Witnesses
G. F. Downing
J. W. Foster

Inventor
G. A. Ensign
By M. D. Leggett & Co
Attorneys (No Model.)  3 Sheets—Sheet 2.
G. A. ENSIGN.
POLISHING MACHINE.
No. 558,641.  Patented Apr. 21, 1896.
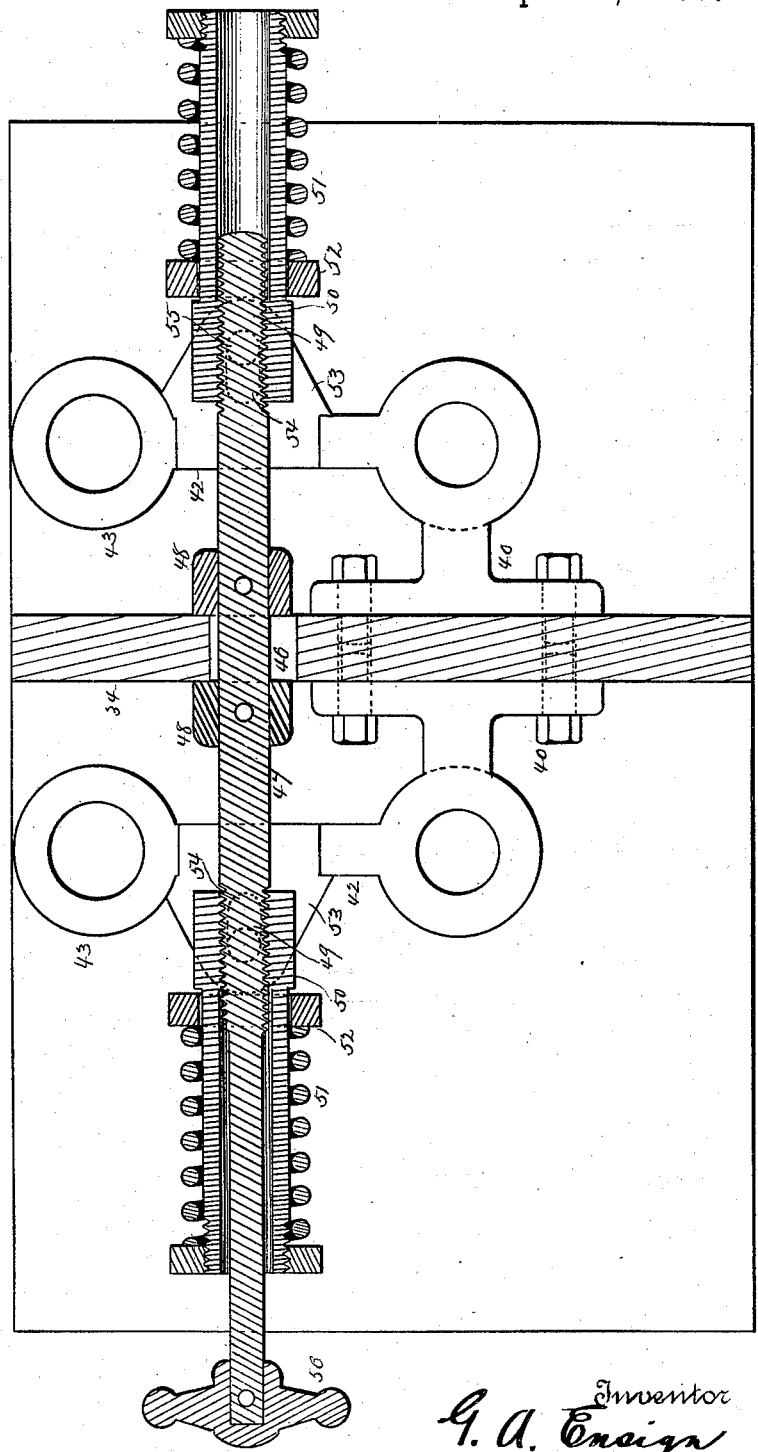
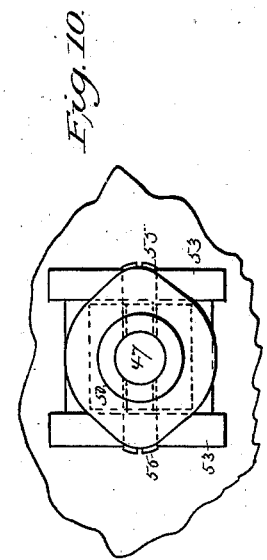
Witnesses
G. F. Downing
J. W. Foster
Inventor
G. A. Ensign
By M. D. Leggett & Co.
Attorneys

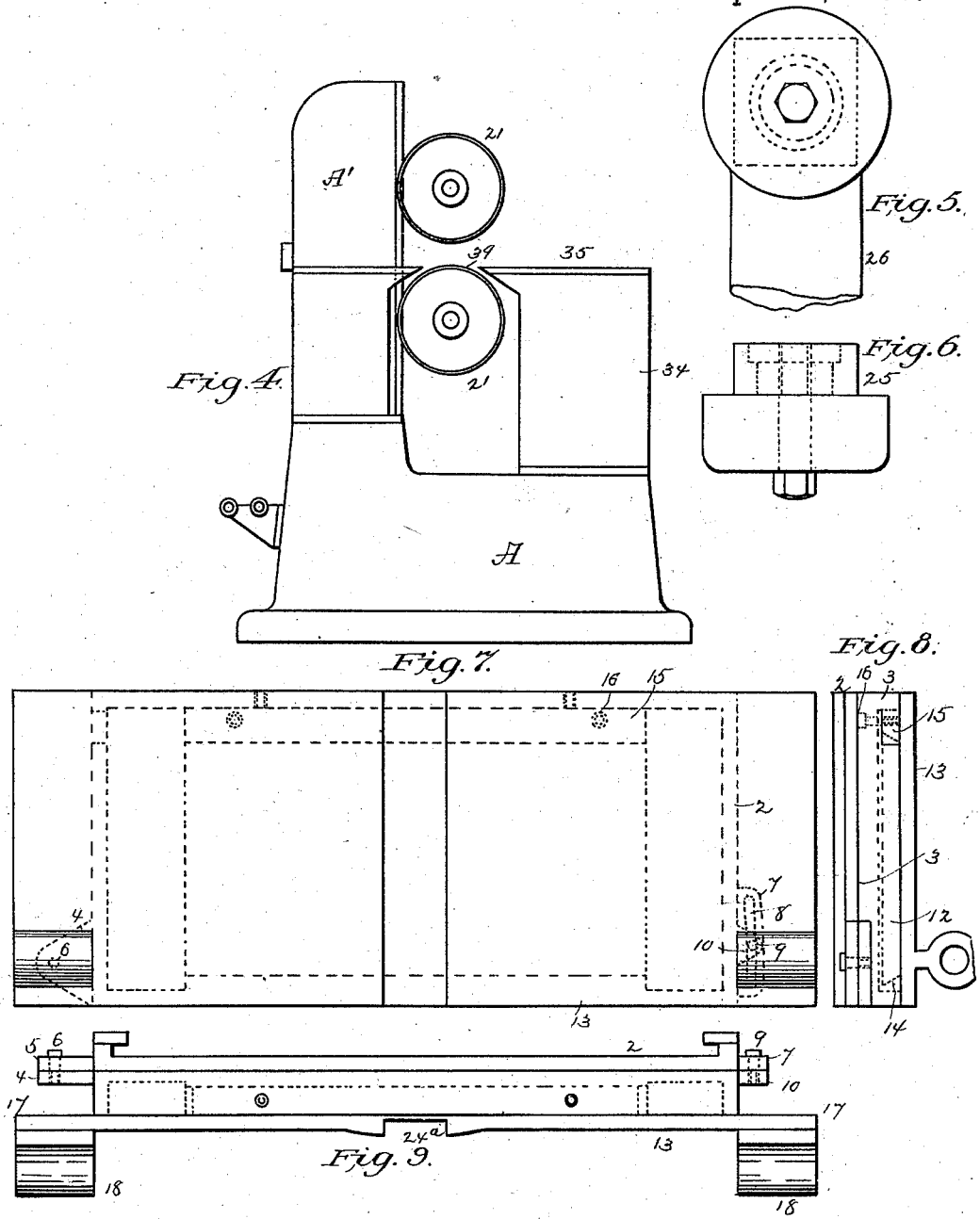

United States Patent Office.

GEORGE A. ENSIGN, OF DEFIANCE, OHIO, ASSIGNOR TO THE DEFIANCE MACHINE WORKS, OF SAME PLACE.

POLISHING-MACHINE.

SPECIFICATION forming part of Letters Patent No. 558,641, dated April 21, 1896.

Application filed September 7, 1895. Serial No. 561,828. (No model.)

*To all whom it may concern:*

Be it known that I, GEORGE A. ENSIGN, of Defiance, in the county of Defiance and State of Ohio, have invented certain new and useful Improvements in Polishing-Machines; and I do hereby declare the following to be a full, clear, and exact description of the invention, such as will enable others skilled in the art to which it appertains to make and use the same.

My invention relates to an improvement in polishing-machines and more particularly to machines for polishing the wooden rims or fellies of wheels, the object of the invention being to so construct a rim-polishing machine that it can be readily adjusted for polishing both faces of rims of different sizes and rims having beveled faces of different degrees.

A further object is to provide a rim-polisher with simply-constructed feed mechanism and to provide efficient means for effecting the accurate adjustment of the same for rims of different thicknesses.

A further object is to so construct a rim-polisher that the polishing-drums shall have a simultaneous rotary and longitudinally-reciprocating motion imparted to them.

A further object is to produce a wood-polishing machine which shall be comparatively simple in construction, easy to adjust, and accurate and effectual in the performance of its functions.

With these objects in view the invention consists in certain novel features of construction and combinations and arrangements of parts, as hereinafter set forth, and pointed out in the claims.

Figure 1:
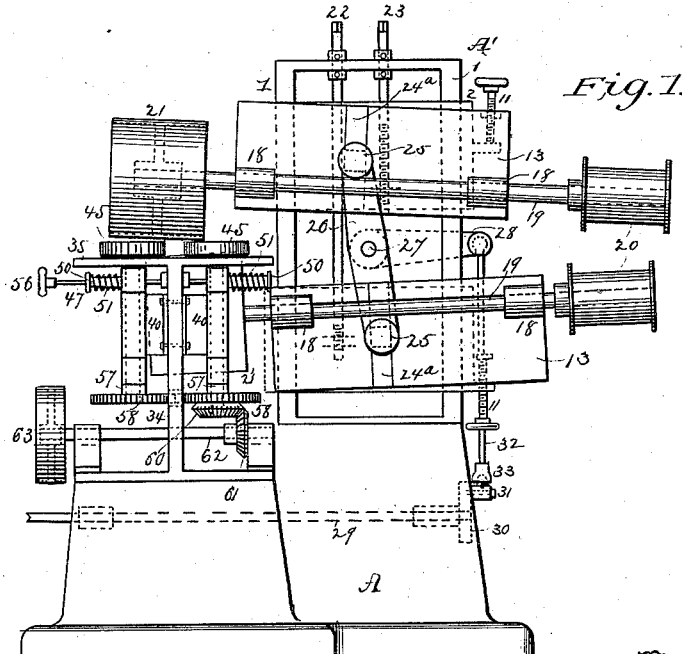
Figure 2:
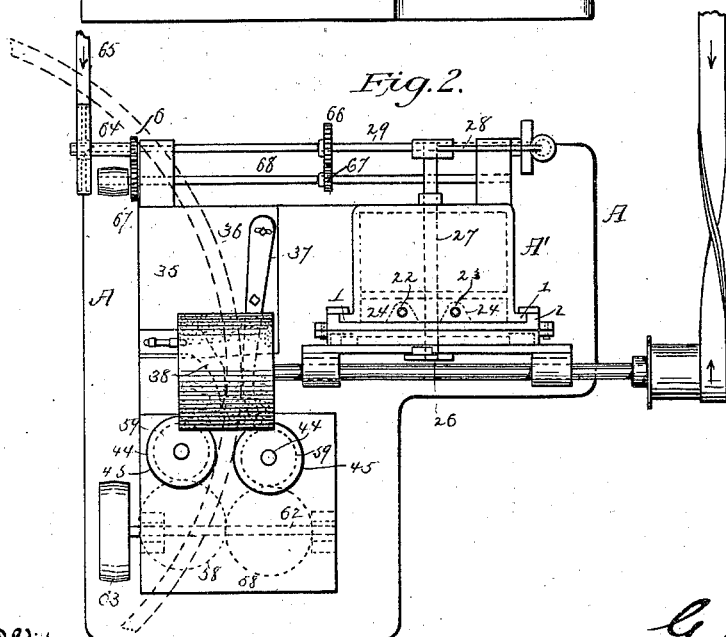

In the accompanying drawings, Figure 1 is an elevation of a machine embodying my improvements. Fig. 2 is a plan view. Figs. 3, 4, 5, 6, 7, 8, 9, and 10 are detail views.

A represents a frame having an upward extension A′, the former being constructed and adapted to receive devices for supporting and guiding the rim to be polished, and the extension A′ being adapted to support the polishing mechanism.

The upward extension or standard A is made with lateral ribs or flanges 1, which constitute guides for saddles 2 2, which are disposed one above the other.

A guide-plate 3 is located against each saddle 2 and provided at one end with a perforated lug or ear 4, disposed coincident with a similar lug or ear 5, projecting from the saddle, and through these lugs a pivot-pin 6 is passed. From the opposite end of each saddle a lug 7 projects, and each lug 7 is made with a slot 8, through which a pin 9 passes, said pin being tapped into a lug or ear 10, projecting from the guide-plate 3. Adjusting-screws 11 are passed through lugs or projections on the saddles 2 and guide-plates 3, whereby to adjust said guide-plates and parts carried thereby to different angles, for a purpose hereinafter more fully explained.

Each guide-plate is recessed in one face for the reception of a dovetailed enlargement or guide 12 on a slide-plate 13, there being, of course, two such slide-plates. One wall of the recess in each guide-plate is beveled, as at 14, for the accommodation of one beveled face of the dovetail on the enlargement 12. The other beveled edge of said enlargement bears against a plate or strip 15, inserted within the recess in the guide-plate and removably secured therein by means of screws 16, inserted through said guide-plate from the rear. The ends of the slide-plate 13 project beyond the ends of the guide-plate 3 at 17 17 and serve to protect the sliding contacts or guideways from dust. This is an important feature of my invention, as the vital part of the mechanism will be protected from the disastrous effect of dust.

Each slide-plate is provided with bosses or enlargements 18, which constitute bearings for spindles 19, each spindle carrying at its respective ends a pulley 20 and a wheel or drum 21, the latter having its face covered with sandpaper or other abrading material.

The spindles 19 and drums or wheels and pulleys carried thereby can be adjusted up or down to accommodate said drums or wheels to wheel-rims of different thicknesses by means of screws 22 23, which pass through a portion of the frame and through lugs or ears 24 on the respective saddles 3. It is apparent that by turning these screws the saddles and the various parts carried thereby will be moved bodily up or down. It will also be seen that by turning the screws 11 the angle of the abrading-drums to each other can be readily adjusted to conform to the bevel of the rim to be operated upon.

In order that the abrading or polishing drums be made to operate evenly throughout their entire length on the rim, it is necessary that said drums be reciprocated as well as rotated. They are rotated by means of suitable straps passing over the pulleys 20, and they will be made to reciprocate an extent about equal to their length by means of mechanism which will now be explained.

Each slide-plate 13 is made between its ends with a transverse groove or recess 24ª for the reception of idlers 25, carried at the respective ends of a cross-head 26. The cross-head 26 is secured to one end of a transverse shaft 27, mounted in the framework, and to the other end of said shaft a lever 28 is fixed.

A shaft 29 is mounted in the lower portion of the framework and at one end carries a crank-wheel 30, having the crank-pin 31 adjustably secured thereto. The crank-pin is connected with the lever 28 by means of a pitman 32 and a universal joint 33. From this arrangement of parts it will be readily understood that when the shaft 29 is rotated a comparatively slow reciprocating motion will be imparted to the polishing or abrading drums.

From the lower portion A of the frame a plate or upright 34 projects and at its upper end supports a table 35 over which the rim 36 to be polished is passed and guided by means of adjustable guides 37 38. One of the polishing or abrading drums is disposed over said table, and the other is disposed below and made to aline with an opening 39 therein.

It is a matter of importance in machines of the class to which this invention relates to provide adequate and accurately-operating mechanism for feeding the rim while it is being polished on its respective faces, and for this purpose the feeding mechanism now to be described will be employed.

To the plate or upright 34 hinges 40 are secured and project therefrom in opposite directions, the loose portions 41 of said hinges being made with arms 42, which latter are provided at their free ends with bosses or enlargements 43 to constitute bearings for vertical spindles 44. The spindles 44 project through the table and at their upper ends carry feed-rollers 45, adapted to be disposed at respective sides of the rim to be operated upon and to bear against the same.

The plate or upright 34 is made with a slot 46, through which a rod 47 passes, said rod having collars 48 secured thereto and bearing against the plate or upright 34. The rod 47 is made with right and left hand screw-threads 49 49, which enter screw-threaded sleeves 50. A spring 51 encircles each sleeve and bears at the outer end against a nut secured to the sleeve and at the inner end against a collar 52 loosely placed on the sleeve 50.

Lugs or enlargements 53 project from the hinged arms 42 and have bearings against the loose collars 52. The lugs 53 are made with elongated slots 54 for the accommodation of screws 55, which are tapped into the sleeves 50.

From this construction and arrangement of parts it will be seen that the feed-rollers 45 are carried by laterally-yielding bearings. When the parts are in their normal positions, the screws 55 will be disposed at one end of the slots 54; but should a rim of greater thickness be placed between the feed-rollers the arms 42 will be forced out more or less, according to the thickness of the rim, against the resistance of the springs 51 and the screws 55 will move in the slots 54. The screw-rod 47 is intended and provided with an operating wheel or handle 56, by means of which to turn it. By turning the screw-rod 47 the arms 42 can be moved and the feed-rollers adjusted for rims of different sizes.

On the hinge-pins 57 of the hinges 40 gear-wheels 58 are respectively mounted and adapted to transmit motion to gear-wheels 59, carried by the spindles 44 of the feed-rollers. One of the gear-wheels 58 carries a bevel-pinion 60, to which motion is transmitted by means of a bevel-pinion 61, carried by a shaft 62, the latter having a pulley 63 secured thereto. A sleeve-pulley 64 is secured to the shaft 29 and receives motion by means of a strap 65 from any convenient source of power. The shaft also carries a gear-wheel 66, which meshes with and transmits motion to a gear-wheel 67 on a shaft 68. The shaft 68 is provided with a pulley 69, from which motion is imparted, by means of a suitable belt, to the pulley 63 on shaft 62, and thus rotary motion is transmitted to the feed-rollers.

My improvements are comparatively simple in construction, can be readily and quickly adjusted for rims of different sizes, and are very effectual in the performance of their functions.

Slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a rim-polishing machine, the combination with suitable framework, of a saddle adjustably secured thereto, a slide-plate adjustably secured to the saddle, a spindle carried by the slide-plate and a polishing-drum carried by the spindle, substantially as set forth.

2. In a rim-polishing machine, the combination with a suitable framework, of a saddle attached thereto, a guide-plate adjustably connected with said saddle, a slide-plate carried by said guide-plate, a spindle carried by the slide-plate and a polishing-drum secured to said spindle, substantially as set forth.

3. In a polishing-machine, the combination with a frame, a saddle attached thereto and a guide-plate having guides, carried by said saddle, of a slide-plate having slides to move on said guides, said slide-plate projecting beyond the guide-plate and serving to protect the guides from dust, and a polishing-drum carried by said slide-plate, substantially as set forth.

4. In a polishing-machine, the combination with framework and a sliding plate, of a spindle mounted on said sliding plate, a polishing-drum and a pulley carried by said spindle, and means for reciprocating said sliding plate, substantially as set forth.

5. In a polishing-machine, the combination with a framework, a pair of sliding plates, and spindles carried in said sliding plates, said spindles having polishing-wheels thereon, of a rock-shaft having two arms thereon, one operating to slide one of the sliding plates and the other to slide the other sliding plate, substantially as set forth.

6. In a polishing-machine, the combination with framework, a sliding plate, a spindle carried by the sliding plate and a polishing-wheel on said spindle, of a shaft, an arm or cross-head on said shaft engaging the sliding plate, a lever projecting from said shaft and means connected with said lever for oscillating the shaft to reciprocate said sliding plate, substantially as set forth.

7. In a polishing-machine, the combination with framework, of a saddle attached thereto, a guide-plate attached to the saddle, a rigid guideway and a removable guideway in said guide-plate, a sliding plate adapted to slide on said guideways, and a polishing-drum carried by said sliding plate.

8. In a polishing-machine, the combination with framework, sliding plates mounted thereon, and a polishing-drum carried by each sliding plate, of a transverse shaft, a cross-head on said transverse shaft and engaging the sliding plates, a lever on said shaft, a crank-shaft and a pitman and universal joint between the crank-shaft and said lever, substantially as set forth.

9. In a rim-polishing machine, the combination with framework, and polishing-drums, of feed-wheels, mounted in yielding bearings, and means for adjusting said feed-wheels toward and away from each other, substantially as set forth.

10. In a rim-polishing machine, the combination with framework and polishing-drums, of hinged arms, spindles mounted in said hinged arms feed-rollers on said spindles, and means for adjusting said hinged arms relatively to each other, substantially as set forth.

11. In a rim-polishing machine, the combination with framework and polishing-rollers, of hinged arms, spindles mounted in said hinged arms, feed-rollers on said spindles, and yielding devices bearing on said hinged arms, substantially as set forth.

12. In a rim-polishing machine, the combination with framework and polishing-drums, of hinged arms, spindles mounted in said hinged arms, feed-rollers on said spindles a rod having right and left hand screw-threads, sleeves having screw-threads to mesh with the screw-threads on the rod, loose collars on said sleeves and bearing on said hinged arms and springs bearing on said collars, substantially as set forth.

13. In a rim-polishing machine, the combination with framework, and polishing-drums, of hinged arms, a spindle mounted in said hinged arms, feed-rollers on said spindles, of a screw-threaded rod, sleeves on said rod, lugs having elongated slots, on the hinged arms, screws passing through said slots and entering the sleeves, loose collars on said sleeves and bearing on said lugs, and springs bearing on said loose collars, substantially as set forth.

14. In a rim-polishing machine, the combination with framework, of arms hinged thereto and carrying spindles, feed-rollers on said spindles, loose gears on the pins of the hinges which connect the arms to the framework, gears on the spindles to receive motion from the first-mentioned gears, and gearing for transmitting motion to said first-mentioned gearing, substantially as set forth.

In testimony whereof I have signed this specification in the presence of two subscribing witnesses.

GEORGE A. ENSIGN.

Witnesses:
WILLIAM A. KETTENRING,
CHARLES KETTENRING.